United States Patent
Holroyd

(10) Patent No.: US 11,561,449 B2
(45) Date of Patent: Jan. 24, 2023

(54) CONSTANT PHASE DIFFERENCE DITHERING CONTROL FOR MACH-ZEHNDER INTERFEROMETER

(71) Applicant: Lumentum Operations LLC, San Jose, CA (US)

(72) Inventor: Amyas Holroyd, Paignton (GB)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 17/360,798

(22) Filed: Jun. 28, 2021

(65) Prior Publication Data

US 2022/0146900 A1 May 12, 2022

Related U.S. Application Data

(60) Provisional application No. 63/198,771, filed on Nov. 11, 2020.

(51) Int. Cl.
*G02F 1/21* (2006.01)
*G02F 1/225* (2006.01)

(52) U.S. Cl.
CPC .............. *G02F 1/212* (2021.01); *G02F 1/225* (2013.01)

(58) Field of Classification Search
CPC ................................. G02F 1/212; G02F 1/225
See application file for complete search history.

(56) References Cited

U.S. PATENT DOCUMENTS

| 6,167,169 A * | 12/2000 | Brinkman | G02F 1/011 385/16 |
| 6,321,000 B1 * | 11/2001 | King | G02B 6/12007 359/333 |
| 6,411,417 B1 * | 6/2002 | Roberts | H04B 10/2942 385/24 |
| 6,687,032 B1 * | 2/2004 | King | H04B 10/25073 398/140 |
| 10,180,325 B2 * | 1/2019 | Bowers | G01C 19/66 |
| 11,092,871 B2 * | 8/2021 | Morton | G02F 1/212 |
| 2017/0307375 A1 * | 10/2017 | Bowers | G01C 19/66 |
| 2020/0409229 A1 * | 12/2020 | Morton | G02F 1/212 |
| 2021/0164894 A1 * | 6/2021 | Prater | G01J 3/45 |
| 2022/0146900 A1 * | 5/2022 | Holroyd | G02F 1/212 |

* cited by examiner

*Primary Examiner* — Andrew Jordan
(74) *Attorney, Agent, or Firm* — Harrity & Harrity, LLP

(57) ABSTRACT

A controller may apply an electrical signal to each of two arms of a Mach-Zehnder Interferometer (MZI) and may dither the electrical signals applied to one, or both, of the arms between a nominal state, a high state and a low state such that there is a constant phase difference between the arms in the high and low states compared to the nominal state, wherein each electrical signal comprises a static component (IL, IR, IL', IR') and a dither component. The controller may change the static component of the respective electrical signal applied to one, or both, of the arms in accordance with changes to an operating point during variation of the dither component and may vary a dither magnitude in accordance with changes in the electrical signal applied to one, or both, of the arms so as to maintain the constant phase difference.

7 Claims, 8 Drawing Sheets

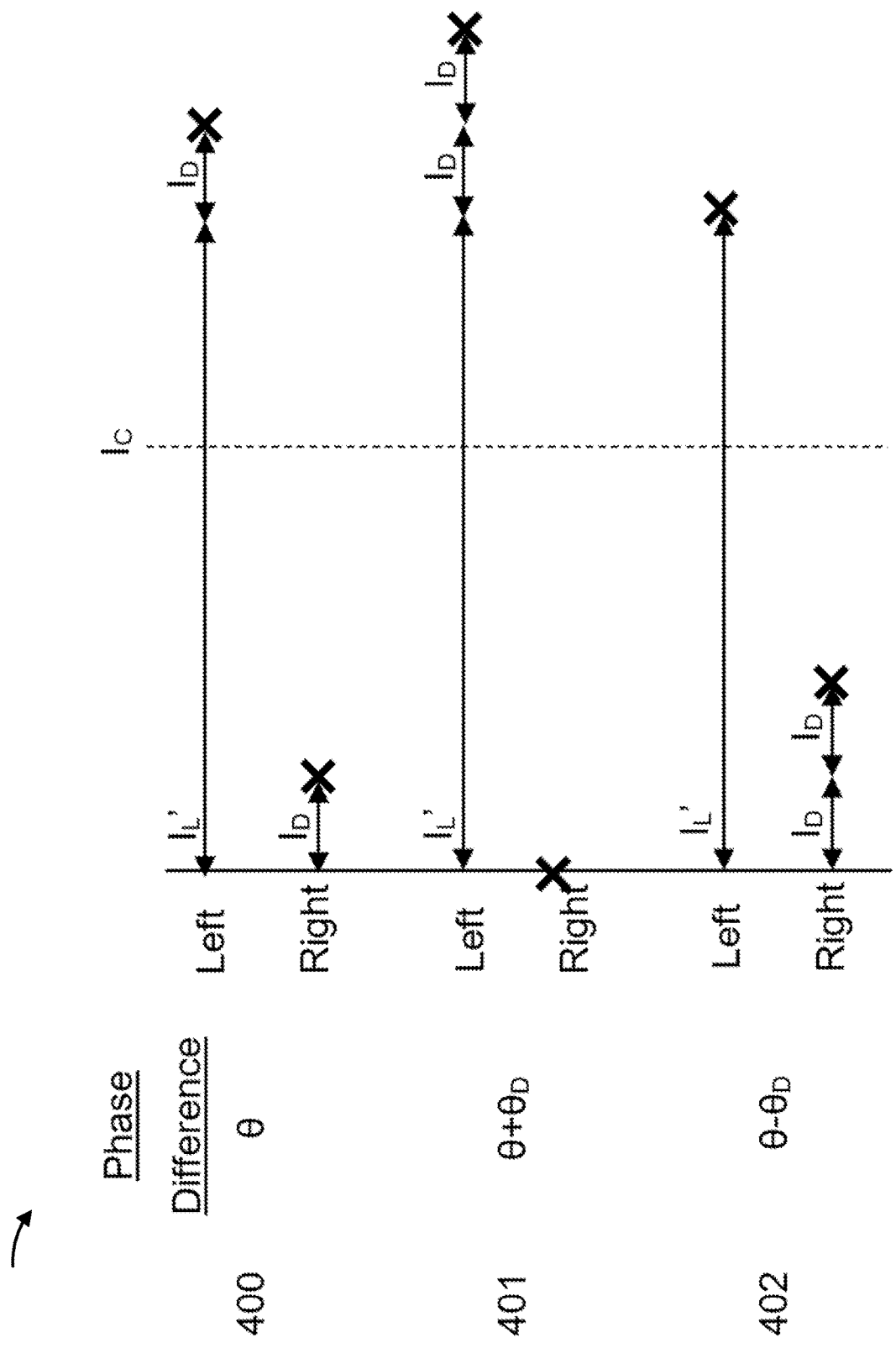

CONSTANT PHASE DIFFERENCE DITHERING CONTROL FOR MACH-ZEHNDER INTERFEROMETER

RELATED APPLICATION

This application claims priority to U.S. Provisional Patent Application No. 63/198,771, entitled "MACH-ZEHNDER INTERFEROMETER SINGLE ENDED CONTROL WITH DIFFERENTIAL DITHER," filed on Nov. 11, 2020, the content of which is incorporated by reference herein in its entirety.

TECHNICAL FIELD

The present invention relates to Mach-Zehnder interferometers, a control scheme for such an interferometer, and to optical assemblies implementing such a control scheme.

BACKGROUND

A Mach-Zehnder interferometer (MZI) is an optical interferometer that modulates light beams, splitting an input beam into two portions, creating a phase difference between the split portions, and then recombining the split portions. Such interferometers are commonly used in optical systems for modulation and measurement of laser light. An example Mach Zehnder interferometer 100 as shown in FIG. 1 comprises a waveguide 101 having a beam splitter 102, which directs light along two arms 103, 104 (e.g. a left arm and a right arm), each of which imposes a phase shift on the light. The light from each arm is then recombined. Adjustments to the phase shifts caused by the arms can be used to control the phase and intensity of output beams in waveguide 105 and waveguide 106. Where the output beam in waveguide 105 is used as the main output from the MZI, the output beam in waveguide 106 may be used as a monitoring output (e.g. Ctap, Complimentary Port tap), or vice versa. The phase shift from each arm may be controlled via a phase electrode based on an electrical signal (e.g. a drive signal) provided by a controller.

Each interferometer arm will cause a certain intrinsic phase shift in addition to the phase shift imposed by the phase electrodes. This intrinsic phase shift is essentially random in many common designs, and both the intrinsic phase shift and the phase shift from the phase electrodes can vary over the life of the interferometer. Therefore, calibration is required to ensure that the interferometer is at the desired "operating point"—i.e. such that the phase difference between the arms is correct to achieve the desired operation of the interferometer.

In order to ensure that an interferometer is at the desired operating point, the controller will run a control algorithm with a feedback loop. Such an algorithm generally involves applying a dither to one or both of the phase electrodes, monitoring how this changes the output of the interferometer, and then adjusting the drive signals to ensure that the output matches the expected output at the operating point.

There are various types of phase electrodes that can be used to control phase in the arms of an MZI. Phase electrodes that cause a thermal change in the arm are one example (a "thermal phase electrode", TPE), but using other types of phase electrodes is equally possible. In general, the phase electrode will cause a change in refractive index of the respective transmission arm of the MZI when a current or voltage is applied to that phase electrode, and the changes to the relative refractive indices of the arms of the MZI will cause a change in the phase difference in the interferometer.

The relationship between the applied currents/voltages and the phase shift may be linear or non-linear. Where the phase shift is non-linear, a "differential dither" is commonly applied by the controller. FIG. 2 shows a differential dither scheme for a dual-ended controlled MZI, i.e. an MZI where the phase electrodes on both arms are varied by the controller to control the phase, as opposed to a "single-ended" control where only one of the phase electrodes is varied by the controller to control the phase.

A dual ended control for an MZI involves defining a fixed common mode current ($I_c$), and controlling the phase electrodes of the left and right arms such that their average current is always the common mode current. In the nominal state 200, i.e. when no dither current is applied, the left electrode is at a current of $I_L = I_c + dx$, and the right electrode is at a current of $I_R = I_c - dx$, where dx represents the magnitude of the difference between the current on each arm in the nominal state and the common mode current. When controlled in this way, the phase shift θ in the nominal state depends approximately linearly on dx, i.e. the difference between the common mode current and each of the phase electrode currents, and the phase shift will vary linearly with the application of a differential dither as described below. While the left electrode has the higher current in this example, the same principle applies where the right electrode has the higher current.

A differential dither is applied by applying a dither current to the left electrode, and an equal and opposite dither current to the right electrode, such that the average current is still the common mode current. The dither current causes a change in the phase difference in the interferometer between a high dither state 201 with phase difference $θ+θ_D$, and a low dither state 202 with phase difference $θ-θ_D$. In the high dither state the left electrode has total current of $I_L+I_D$ and the right electrode has a total current of $I_R-I_D$, where $I_D$ is the maximum magnitude of the dither current. In the low dither state the left electrode has total current $I_L-I_D$ and the right electrode has a total current of $I_R+I_D$. In all cases, the average of the total current on the left electrode and the total current on the right electrode (i.e. the common mode current) is constant. Since the relationship between such changes in current and the phase is near-linear, this simplifies the control algorithm for the feedback loop.

However, such a scheme is limited—the current to each phase electrode must be positive, and so the dither current cannot be greater than the lower of the two nominal phase electrode currents (otherwise the actual phase electrode current would become negative at the high or low dither state). In order to ensure this does not happen in an interferometer which might require large phase shifts over the course of its life, the common mode is set relatively high, so that there is plenty of room to adjust e.g. the right phase electrode current downwards before reaching the state where the dither would cause a negative current. However, the power consumption of the MZI is dependent upon the common mode current—and so using a high common mode current (to allow space for future calibration and thereby ensure that the interferometer can achieve its operating point over a long timeframe) results in significant increases to the power consumption.

There is therefore a need for a dither control scheme which allows for maintaining the operating point over a long timeframe without unduly increased power consumption.

SUMMARY

In some implementations, a method of operating a Mach-Zehnder Interferometer (MZI) to maintain an operating point includes applying an electrical signal to each of two arms of the MZI; dithering the electrical signals applied to one, or both, of the arms between a nominal state, a high state and a low state such that there is a constant phase difference between the arms in the high and low states compared to the nominal state, wherein each electrical signal comprises a static component ($I_L$, $I_R$, $I_L'$, $I_R'$) and a dither component, and dithering the electrical signals comprises varying the dither component such that a difference between the magnitude of the electrical signals in the nominal state and the magnitude of the same electrical signal in the high or low state is equal to a dither magnitude (ID); changing the static component of the respective electrical signal applied to one, or both, of the arms in accordance with changes to the operating point during variation of the dither component; and varying the dither magnitude in accordance with changes in the electrical signal applied to one, or both, of the arms so as to maintain the constant phase difference.

In some implementations, a Mach-Zehnder interferometer comprises: two optical waveguide arms, each causing a phase shift for light within the arm; two phase electrodes, associated with, and corresponding to, the two optical waveguide arms, each electrode of the two phase electrodes to receive an electrical signal for changing the phase shift of light within the corresponding arm; and a controller configured to: apply an electrical signal to each of the two arms of the MZI; dither the electrical signals applied to one, or both, of the arms between a nominal state, a high state and a low state such that there is a constant phase difference between the optical waveguide arms in the high and low states compared to the nominal state; wherein each electrical signal comprises a static component (IL, IR) and a dither component, and dithering the electrical signals is configured to vary the dither component such that a difference between the magnitude of the electrical signals in the nominal state and the magnitude of the same electrical signal in the high or low state is equal to a dither magnitude (ID); change the static component of the respective electrical signal applied to one, or both, of the optical waveguide arms in accordance with changes to the operating point during variation of the dither component; and vary the dither magnitude in accordance with changes in the electrical signal applied to one, or both, of the optical waveguide arms so as to maintain the constant phase difference.

In some implementations, a non-transitory computer-readable medium storing a set of instructions includes one or more instructions that, when executed by one or more processors of a Mach-Zehnder interferometer (MZI), cause the MZI to: apply an electrical signal to each of two arms of the MZI; dither the electrical signals applied to one, or both, of the arms between a nominal state, a high state and a low state such that there is a constant phase difference between the arms in the high and low states compared to the nominal state; wherein each electrical signal comprises a static component (IL, IR) and a dither component, and dithering the electrical signals is configured to vary the dither component such that a difference between the magnitude of the electrical signals in the nominal state and the magnitude of the same electrical signal in the high or low state is equal to a dither magnitude (ID); change the static component of the respective electrical signal applied to one, or both, of the arms in accordance with changes to the operating point during variation of the dither component; and vary the dither magnitude in accordance with changes in the electrical signal applied to one, or both, of the arms so as to maintain the constant phase difference.

BRIEF DESCRIPTION OF THE DRAWINGS

FIG. 4 is a chart illustrating an alternative model of the dithering scheme of FIG. 3;

DETAILED DESCRIPTION

The following detailed description of example implementations refers to the accompanying drawings. The same reference numbers in different drawings may identify the same or similar elements.

The below description provides a dither control scheme for an MZI. The nature of this control scheme means that some examples can be considered as either a double-ended drive for an MZI with variable common mode, or equivalently as a single-ended drive for an MZI where a dither is applied to an "undriven" arm of the interferometer. Unless specified, a "double-ended" model will be used to describe the behavior of the MZI, but it should be appreciated that the two possible models are different descriptions of the same physical behavior, rather than alternative control schemes.

Figure 3:
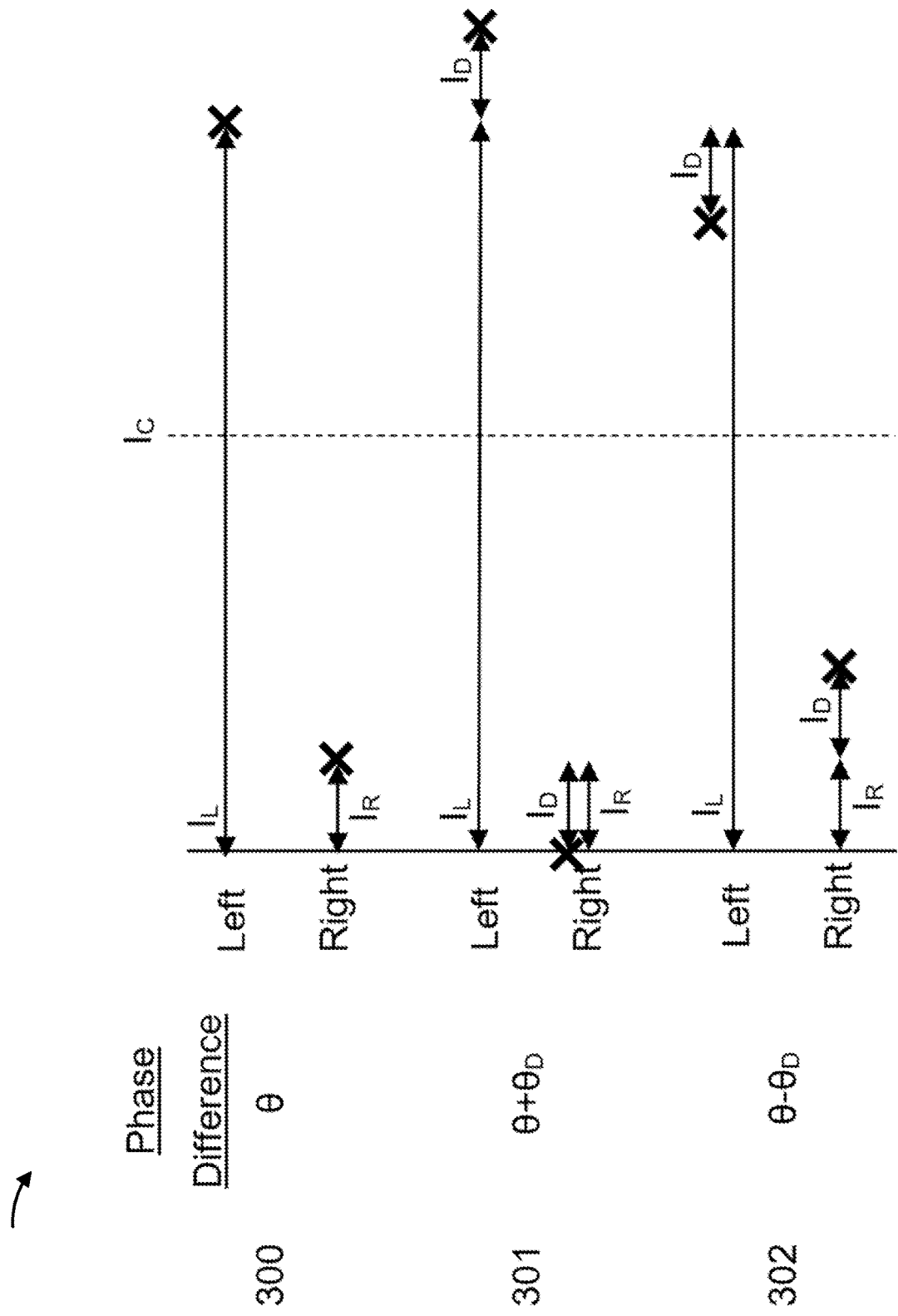
FIG. 3 is a chart illustrating an exemplary dithering scheme.

FIG. 3 illustrates a control scheme (e.g., that is executed by one or more processors of an MZI) in the "dual ended" model. The MZI may be in a "nominal" state 300, at which a left phase electrode has current $I_L$, and a right phase electrode has current $I_R$. In this example, the left phase electrode may have the greater current, but this may be reversed in this or all subsequent examples. A dither current may be applied to each electrode—e.g. such that the left electrode has current $I_L-I_D$, and the right electrode has current $I_R-I_D$ in the dither high state 301 (with plus and minus signs reversed for the dither low state 302), where $I_D$ is the "dither magnitude" i.e. a magnitude of a difference in current between the dither high state and the nominal state, in each arm (or equivalently a magnitude of a difference in current between the dither low state and the nominal state). The left and right nominal currents may be adjusted to approach a desired operating point based on measurements taken during the dither. However, unlike conventional control schemes, no attempt is made to maintain a constant common mode current.

In some implementations, the dither current may be varied with each iteration of a feedback loop, i.e. each time one or both of the drive currents $I_L$ and $I_R$ are changed, such that a phase difference OD in the MZI between the nominal current and the dither high or low state is constant between iterations of the feedback loop.

The dither current required for the phase difference to be maintained may be determined based on a behavior of the phase electrodes or from prior calibration.

For the nominal state, where θ is the phase difference in the MZI in the nominal state, $\theta_L(I_L)$ is the phase shift caused by the left phase electrode at the nominal left phase electrode current $I_L$ in the left arm, $\theta_R(I_R)$ is the phase shift caused by the right phase electrode at the nominal right phase current $I_R$ in the right arm, and $\theta_i$ is the intrinsic phase difference between the two arms of the MZI (i.e. the phase difference when no current is applied to either electrode), then:

$$\theta = \theta_L(I_L) - \theta_R(I_R) - \theta_i$$

Which can be rearranged to give:

$$\theta + \theta_i = \theta_L(I_L) - \theta_R(I_R) \quad \text{Eq. (1)}$$

For the dither high state, where θD is the phase change of the dither, $\theta_L(I_L+I_D)$ is the phase shift caused by the left phase electrode at the nominal left phase electrode current plus the dither magnitude in the left arm, and $\theta_R(I_R-I_D)$ is the phase offset caused by the right phase electrode at the nominal right phase electrode current minus the dither magnitude in the right arm, then:

$$\theta + \theta_D = \theta_L(I_L+I_D) - \theta_R(I_R+I_D) - \theta_i$$

Which can be rearranged to give:

$$\theta + \theta_i = \theta_L(I_L+I_D) - \theta_R(I_R+I_D) - \theta_D \quad \text{Eq. (2)}$$

Setting equations (1) and (2) equal, and substituting for the phase vs current relationship of the phase electrodes allows $I_D$ to be obtained in terms of $\theta_D$, $I_L$, and $I_R$ (and any other terms in the relationship, e.g. resistance)—i.e. the dither magnitude required for a given phase difference can be determined in terms of known parameters.

For a thermal phase electrode, where $$\theta(I) = \frac{I^2 R}{P_\pi},$$

where R is the resistance of the thermal phase electrode and $P_\pi$ is a constant representing the applied power required for a phase shift of π radians, setting (1) and (2) equal, substituting, and rearranging as described above gives:

$$I_L^2 \frac{R}{P_\pi} - I_R^2 \frac{R}{P_\pi} = (I_L + I_D)^2 \frac{R}{P_\pi} - (I_R - I_D)^2 \frac{R}{P_\pi} - \theta_D \quad \text{Eq. (3)}$$

$$I_D = \frac{\theta_D P_\pi}{2(I_L + I_R)R}$$

Which is the required dither magnitude for a given required phase and given nominal currents for thermal phase electrodes. This is recalculated for each iteration of the feedback loop, i.e. when $I_L$ and/or $I_R$ are adjusted.

While the above derivation has been described in terms of the relationship between phase and current, it will be appreciated that it can be equivalently considered in terms of phase and the voltage used to drive the phase electrode, particularly for electrode types where the voltage/phase relationship is simpler.

The adjustment of the nominal left and right phase electrode currents in response to the dithering may be any suitable adjustment that brings the MZI closer to the operating point—unlike with conventional differential control for a dual-ended control scheme, there is no need to maintain a constant common mode current between iterations of the feedback loop (though common mode current will be consistent within a single iteration). In the example shown in FIG. 3, the current on the right phase electrode may be adjusted such that the nominal right phase electrode current is equal to the dither magnitude within each feedback loop (setting $I_R=I_D$ in equation 1 and 2, before rearranging to get the expression for the dither magnitude $I_D$). This is the condition which results in the minimum common mode current, and therefore minimum power usage for this control scheme. However, this is not necessary to implement the control scheme—a residual current on the right phase electrode (or, in general, the low-current electrode) may still be present even in the dither high state where the total current on that electrode is minimized.

The dither may be applied as a stepped dither (i.e. stepping between the nominal state, the high dither state, and the low dither state), as a sine wave (with average value at the nominal state, and varying between the high and low dither states), or any other suitable waveform which varies between the high and low dither states.

An alternative model of the dithering scheme of FIG. 3 is shown in FIG. 4. In this model, the control scheme is treated as a single-ended control having a dither on both arms. In the nominal state 400, the left electrode has current $I_L'+I_D$, where $I_L'=I_L-I_D$ (with the same symbols referring to the same quantities for FIGS. 3 and 4), and the right electrode has current $I_D$. In the dither high state 401, the left electrode has current $I_L'+2I_D$, and the right electrode has zero current. In the dither low state 402, the left electrode has current $I_L'$, and the right electrode has current $2I_D$. As such, instead of being considered as a dither varying between $-I_D$ and $I_D$, the dither current is considered to vary between 0 and $2I_D$ on each arm, with the total dither on the two arms always summing to $2I_D$. This model mainly applies to the case where the current on the right phase electrode goes to 0 at the dither high state—where there is a residual current on the right phase electrode, the "dual-ended" model is more appropriate.

Figure 1:
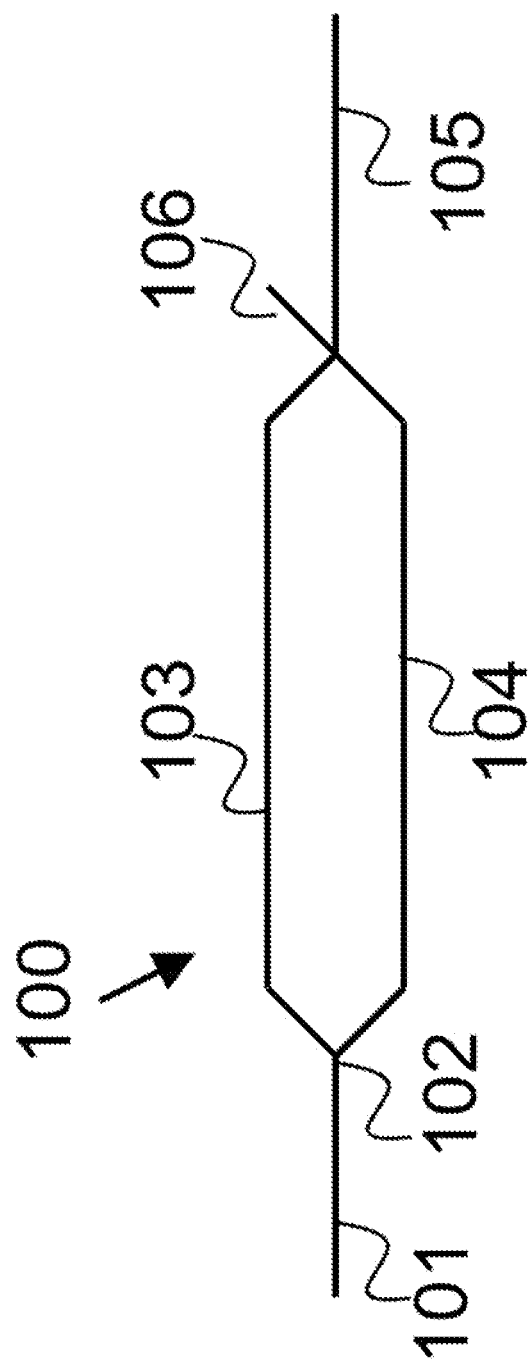
FIG. 1 is a diagram illustrating a Mach Zehnder Interferometer (MZI)
Figure 5A:
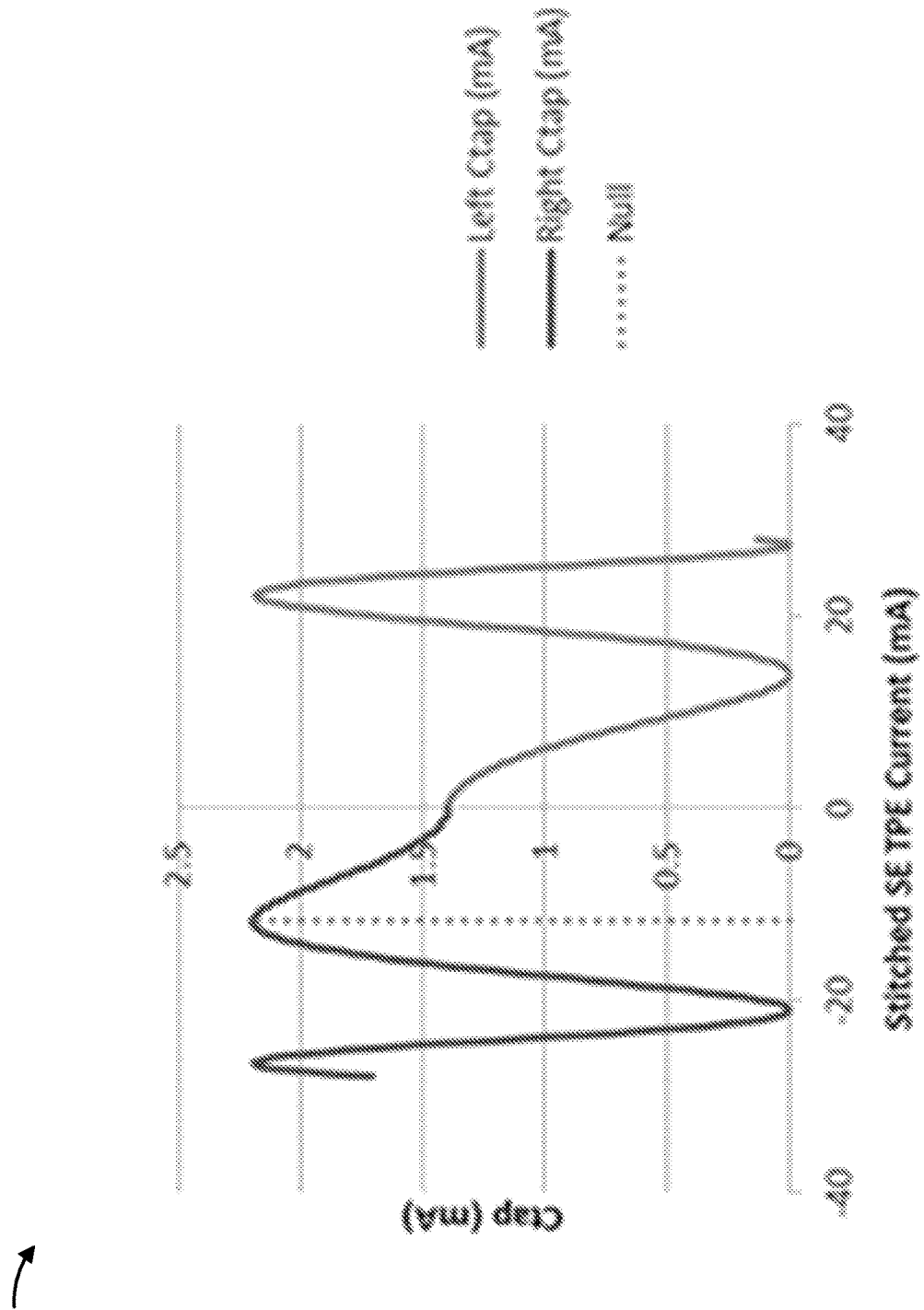
FIG. 5A shows the response of Ctap of an MZI against current applied to each phase electrode.

FIG. 5A shows a current from a photodetector connected to a Ctap (e.g. a Ctap detector) on a waveguide 106 of the MZI (as illustrated in FIG. 1). FIG. 5A is a composite graph of two current sweeps. The first current sweep is illustrated left of the vertical axis and sweeps a right TPE current from 40 mA to 0 mA (shown as a negative current to illustrate continuity in the graph) while holding a left TPE current at 0 mA. The second current sweep is the reverse, holding the right TPE current at 0 mA and sweeping from 0 to 40 mA on the left TPE (shown as a positive current). No dither was applied to either electrode in FIG. 5A. This shows that a phase change in single ended current is non-linear—i.e. a fixed change in current at one end of the range will have a different phase change to the same change in current at the other end of the range.

Figure 5B:
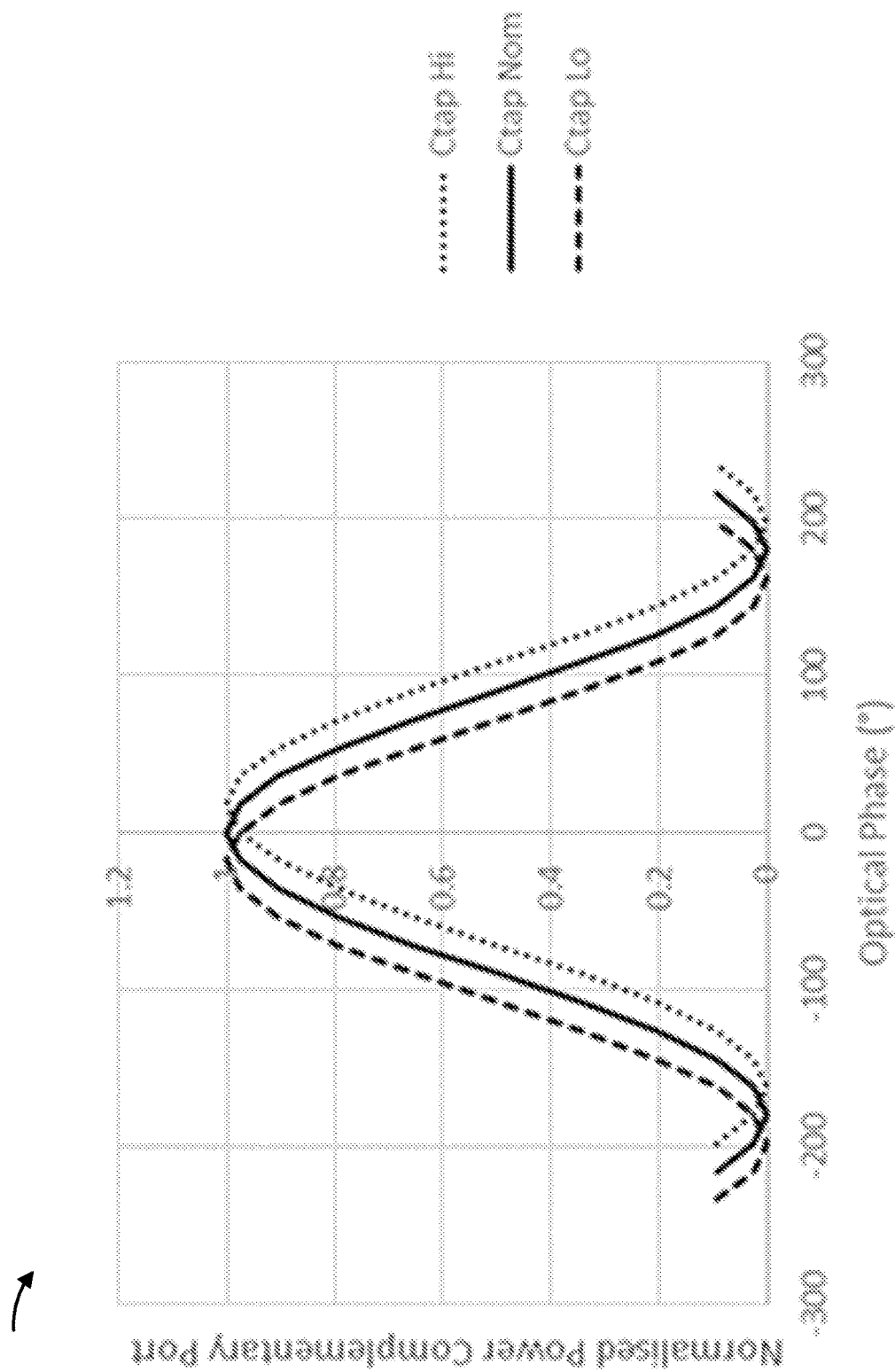
FIG. 5B shows the effect of dithering on Ctap.
Figure 5C:
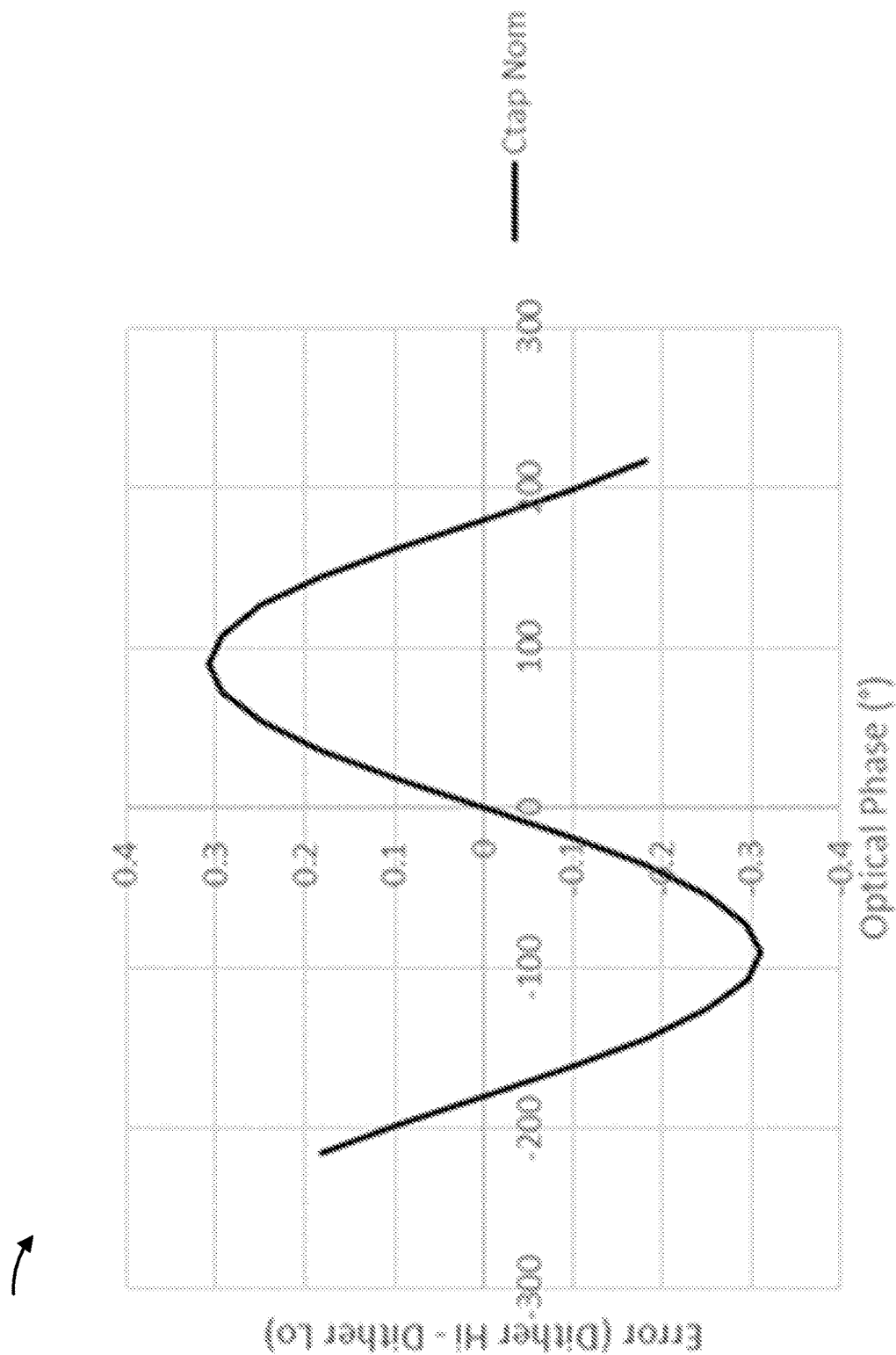
FIG. 5C shows the error term generated from the dither of FIG. 5B.

Applying dither with that current sweep and plotting normalized power measured at the Ctap detector for the dither high, dither low, and nominal states, gives three closely-spaced curves. FIG. 5B illustrates three such curves with exaggerated phase dither of 20 degrees, for clarity of illustration. Taking the difference between the high and low dither signals provides the error signal shown in FIG. 5C. Looking at FIGS. 5B and 5C, the error signal is zero at both maximum and minimum Ctap current which occurs at 0°, −180° and 180° optical phase). The feedback loop is configured to drive this error signal to zero by adjusting the driven arm current in order to change the phase difference in the MZI.

Figure 2:
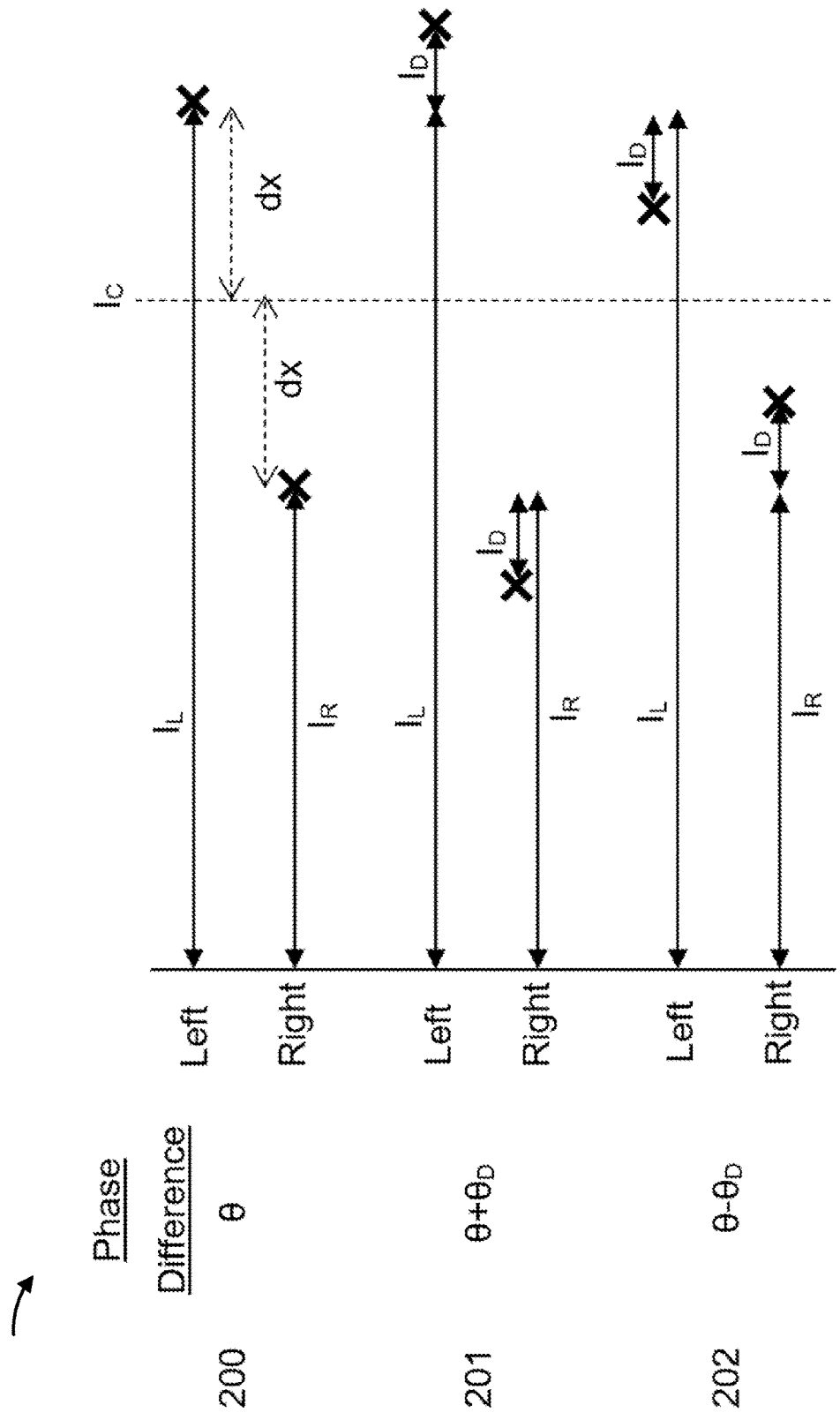
FIG. 2 is a chart illustrating a prior art differential dithering scheme.

Such a feedback loop can be implemented by measuring the Ctap output at both the high and low dither states, determining the value of the error signal from the measurement, and adjusting the nominal phase electrode currents (i.e the currents $I_L$ and/or $I_R$ in FIG. 2) based on the value of the error signal. The dither magnitude $I_D$ is then adjusted based on the new nominal phase electrode currents.

While the above has referred to the adjustment of currents to phase electrodes of an MZI, it will be appreciated that the same principles apply to any electrical input to the arms of the MZI. The electrical input signal to each arm can be considered as comprising a static component (e.g. the nominal phase electrode current as described above) and a dither component. The dither component is varied to provide a dither, such that the variation in the electrical input signal between the nominal state and the dither high state or dither low state equals a dither magnitude (e.g. $I_D$ in the examples above). Based on changes to the operating point of the MZI, the static components are adjusted to approach the desired operating point, and then the dither magnitude is varied to keep the phase difference of the dither constant.

Figure 6:
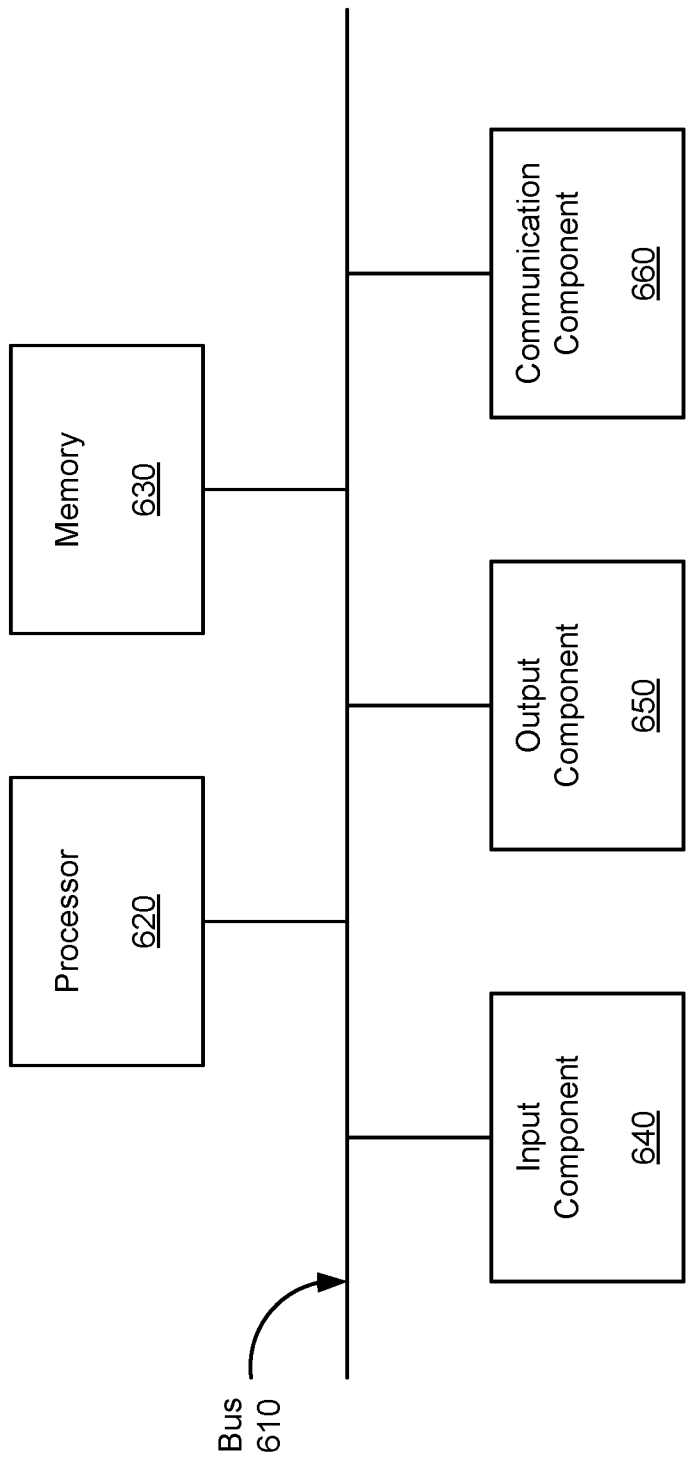
FIG. 6 is a diagram of example components of one or more devices of an MZI.

FIG. 6 is a diagram of example components of a device 600, which may correspond to an MZI described herein. In some implementations, the MZI may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, the term "component" is intended to be broadly construed as hardware, firmware, and/or a combination of hardware and software. It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of operating a Mach-Zehnder Interferometer (MZI) to maintain an operating point, the method performed by a controller of the MZI, the method comprising:
applying an electrical signal to each of two arms of the MZI;
dithering electrical signals applied to one, or both, of the arms between a nominal state, a high state and a low state such that there is a constant phase difference between the arms in the high and low states compared to the nominal state,
wherein each electrical signal comprises a static component ($I_L$, $I_R$, $I_L'$, $I_R'$) and a dither component, and dithering the electrical signals comprises varying the dither component such that a difference between a magnitude of the electrical signals in the nominal state and a magnitude of a same electrical signal in the high state or the low state is equal to a dither magnitude ($I_D$);
changing the static component of a respective electrical signal applied to one, or both, of the arms in accordance with changes to the operating point during variation of the dither component; and
varying the dither magnitude in accordance with changes in the electrical signals applied to one, or both, of the arms so as to maintain the constant phase difference.

2. The method according to claim 1, wherein each dither current varies as one of:
stepwise between the nominal state, the high state, and the low state; or
sinusoidally between the high state and the low state, wherein the nominal state is an average value of a sine wave.

3. The method of claim 1, wherein changing the static component of the respective electrical signal(s) comprises changing the static components such that an average value of the static components is not maintained.

4. The method of claim 1, wherein the static component of the electrical signals applied to at least one of the arms is equal in magnitude to the dither magnitude.

5. The method of claim 1, wherein each arm comprises a thermal phase electrode, and the dither magnitude is a current $$I_D = \frac{\theta_D P_\pi}{2(I_R + I_L)R},$$

wherein:
$\theta_D$ is the constant phase difference,
$P_\pi$ is a constant representing applied power required for a phase shift of $\pi$ radians,
$I_R$ is the current applied to one of the thermal phase electrodes in the nominal state,
$I_L$ is the current applied to the other of the thermal phase electrodes in the nominal state, and
R is a resistance of each thermal phase electrode.

6. A Mach-Zehnder interferometer (MZI), comprising:
two optical waveguide arms, each causing a phase shift for light within the two optical waveguide arms;
two phase electrodes, associated with, and corresponding to, the two optical waveguide arms, each electrode of the two phase electrodes to receive an electrical signal for changing the phase shift of light within corresponding optical waveguide arms of the two optical waveguide arms; and
a controller configured to:
apply an electrical signal to each of the two optical waveguide arms of the MZI;
dither electrical signals applied to one, or both, of the two optical waveguide arms between a nominal state, a high state and a low state such that there is a constant phase difference between the two optical waveguide arms in the high and low states compared to the nominal state;
wherein each electrical signal comprises a static component ($I_L$, $I_R$) and a dither component, and dithering the electrical signals is configured to vary the dither component such that a difference between a magnitude of the electrical signals in the nominal state and a magnitude of the same electrical signal in the high state or the low state is equal to a dither magnitude ($I_D$);
change the static component of a respective electrical signal applied to one, or both, of the two optical waveguide arms in accordance with changes to an operating point during variation of the dither component; and
vary the dither magnitude in accordance with changes in the electrical signals applied to one, or both, of the two optical waveguide arms so as to maintain the constant phase difference.

7. A non-transitory computer-readable medium storing a set of instructions, the set of instructions comprising:
one or more instructions that, when executed by one or more processors of a Mach-Zehnder interferometer (MZI), cause the MZI to:
apply an electrical signal to each of two arms of the MZI;
dither electrical signals applied to one, or both, of the arms between a nominal state, a high state and a low state such that there is a constant phase difference between the arms in the high and low states compared to the nominal state;
wherein each electrical signal comprises a static component ($I_L$, $I_R$) and a dither component, and dithering the electrical signals is configured to vary the dither component such that a difference between a magnitude of the electrical signals in the nominal state and a magnitude of the same electrical signal in the high state or the low state is equal to a dither magnitude ($I_D$);
change the static component of a respective electrical signal applied to one, or both, of the arms in accordance with changes to an operating point during variation of the dither component; and vary the dither magnitude in accordance with changes in the electrical signals applied to one, or both, of the arms so as to maintain the constant phase difference.

\* \* \* \* \*